Sept. 25, 1928.
C. A. KULENKAMPFF
1,685,700
BRICK ICE CREAM CUTTER
Filed April 22, 1926
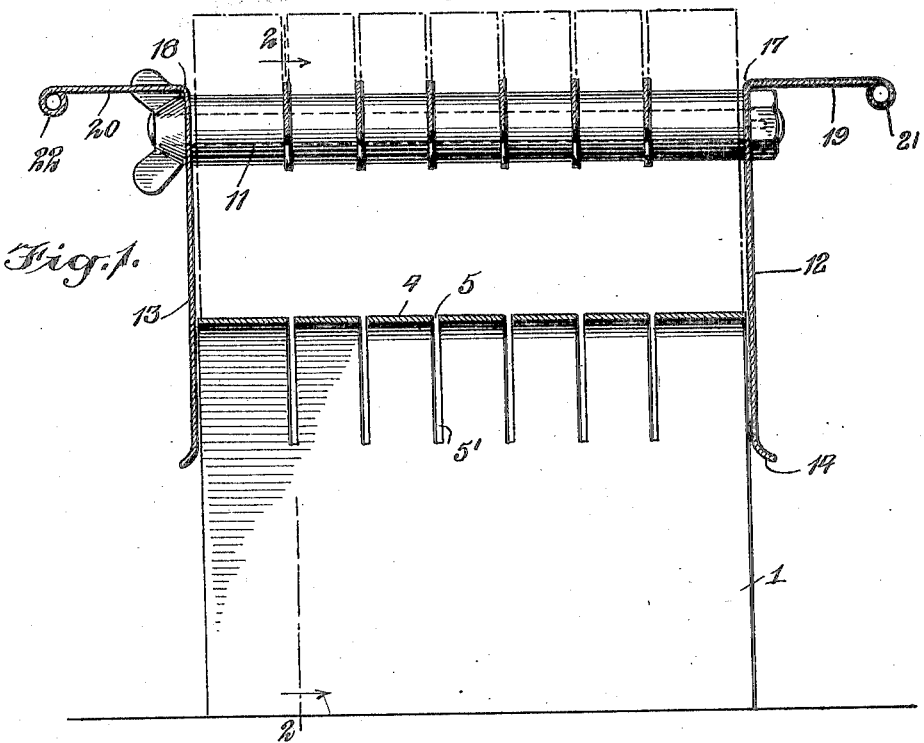
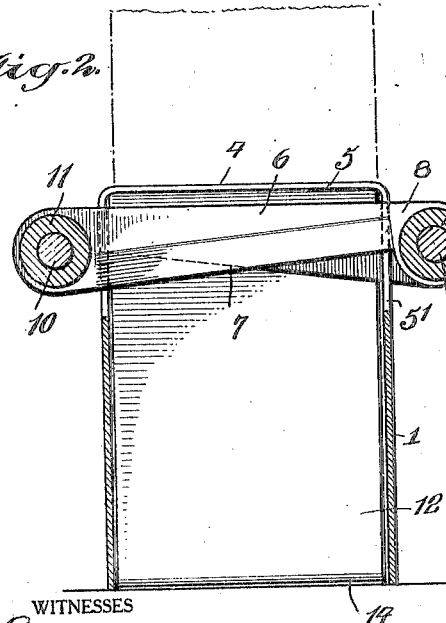
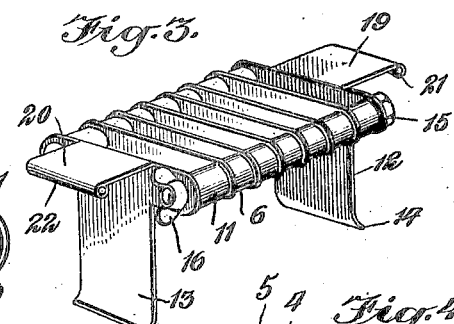
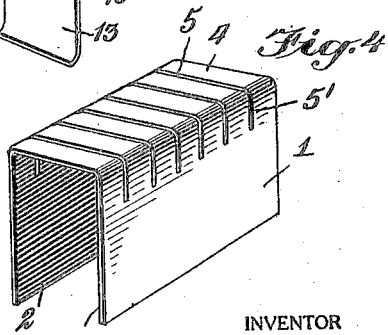
WITNESSES
INVENTOR
C. A. Kulenkampff
BY
ATTORNEYS Patented Sept. 25, 1928.

1,685,700

UNITED STATES PATENT OFFICE.

CARL A. KULENKAMPFF, OF NEW YORK, N. Y.

BRICK-ICE-CREAM CUTTER.

Application filed April 22, 1926. Serial No. 103,929.

This invention relates to ice cream cutters and particularly to an improved structure for cutting brick ice cream and has for an object to present a structure which may be adjusted to cut the ice cream into any desired number of sections.

Another object of the invention is to provide a brick ice cream cutter wherein the support for the ice cream acts as a receiving member for the cutters after they have passed through the ice cream so that the ice cream may be readily removed from the support without removing the cutters.

A further object, more specifically, is to provide an ice cream cutter in which a slotted section is provided co-acting with inclined cutting members and guides for causing them to enter the slots after performing the cutting operation and thus leaving the cut cream free of knives.

In the accompanying drawing—

Figure 1 is a longitudinal vertical sectional view through a cutter, disclosing an embodiment of the invention.

Figure 2 is a sectional view through Figure 1, approximately on line 2—2, the cutting blades being shown in their lowered position.

Figure 3 is a perspective view of the cutting blades and guides shown in Figure 1.

Figure 4 is a perspective view of the support shown in Figure 1.

Referring to the accompanying drawing by numerals, 1 indicates a support which is preferably a piece of sheet metal bent so as to present a U-shaped structure in cross section. This form of support presents a pair of side plates 2 and 3 acting as supporting legs and a top surface 4 adapted to receive the ice cream. The top surface is supplied with a number of slits 5 merging into side slits 5' whereby the various knives 6 may enter the slots in the support so as to be below the surface 4 as illustrated in Figure 2. When a brick of ice cream has been cut and the knives 6 moved to the position shown in Figure 2, the ice cream is free of the knives and may be readily removed without molesting the knives. There is a knife 6 for each of the slots 5 and these knives are preferably of the same construction.

As indicated in Figure 2, the knives 6 are each provided with a cutting edge 7 and at the edges incline from one end to the other so as to give in a certain sense a shearing cut. The alternate knives are arranged so that the edges 7 will be inclined in opposite directions and thus prevent the ice cream from shifting as the knives are forced therethrough. Each of the knives is provided with a pair of apertured heads 8 and through these heads extend the respective clamping rods 9 and 10. Suitable sleeves 11 surround the respective rods 9 and 10 and act to space the various blades 6 so that they will properly enter the slots 5 when the end guiding plates 12 and 13 are passing over the ends of the support 1. It will be noted that the guides 12 and 13 are each formed with a flaring lower end 14 whereby the guides may properly pass over the ice cream and from thence over the ends of the support 1. The bolts 9 and 10 are each preferably provided with an ordinary nut 15 at one end and with a wing nut 16 at the opposite end whereby the respective bolts are clamped firmly in position when in use but may be readily removed to provide different tubular members 11 which may be longer or shorter so as to increase or decrease the number of blades 6. There are six blades shown in the drawing but if desired, a less number could be used or a larger number could be used but when a less number or a larger number is used, the tubular spacing members 11 must be changed accordingly and also a new support 1 must be provided having properly spaced slots 5.

The construction shown in the drawing would operate to cut a brick of cream into seven pieces. If it should be desired to have fourteen pieces, the brick could be cut centrally longitudinally and this would result in the fourteen pieces desired. From Figures 1 and 3 it will be noted that the guides 12 and 13 are formed of sheet metal and are bent at points 17 and 18 respectively for forming hand holes 19 and 20, said hand holes being preferably provided at the outer edges with turned over or curved members 21 and 22. After a brick of ice cream has been cut with the knives 6, they are preferably left in the position shown in Figure 2 until the cut cream has been moved from the support 1. They are then removed and if desired, another brick is placed on the support 1 and the same operation is repeated.

From Figure 1 it will be noted that the knives 6 are so arranged that the end sections of the brick of ice cream are seemingly larger when cut than the intermediate sections of the cut brick. This has been formed in this way because the ends of the brick of ice cream are usually bent over and crushed out of shape somewhat so that when the parts are arranged as shown in Figure 1, the resulting blocks will be substantially the same size. It is, however, evident that the various tubular members 11 could be made of a size to give a different spacing without departing from the spirit of the invention.

What I claim is:

In a brick ice cream cutter, a support having slots in its top, said slots extending into the sides of the support, a knife carrier separate from the support and adapted to slide thereon, the carrier comprising members having flanged upper ends forming handles, and a plurality of cutters mounted between the upper ends of the end members, the cutting edges of the knives being inclined from one end to the other and the cutters being arranged with the edges of each individual knife inclined in one direction with alternate knives being inclined in opposite directions.

CARL A. KULENKAMPFF.